United States Patent
Wu et al.

(10) Patent No.: US 10,303,276 B2
(45) Date of Patent: May 28, 2019

(54) TOUCH CONTROL SYSTEM, TOUCH CONTROL DISPLAY SYSTEM AND TOUCH CONTROL INTERACTION METHOD

(71) Applicants: BOE TECHNOLOGY GROUP CO., LTD., Beijing (CN); PEKING UNIVERSITY, Beijing (CN)

(72) Inventors: Yanbing Wu, Beijing (CN); Xing Zhang, Beijing (CN); Yi Wang, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 112 days.

(21) Appl. No.: 15/515,848

(22) PCT Filed: May 16, 2016

(86) PCT No.: PCT/CN2016/082219
§ 371 (c)(1),
(2) Date: Mar. 30, 2017

(87) PCT Pub. No.: WO2017/136980
PCT Pub. Date: Aug. 17, 2017

(65) Prior Publication Data
US 2018/0232087 A1 Aug. 16, 2018

(30) Foreign Application Priority Data
Feb. 14, 2016 (CN) .......................... 2016 1 0084809

(51) Int. Cl.
*G06F 3/041* (2006.01)
*G06F 3/0488* (2013.01)
(Continued)

(52) U.S. Cl.
CPC ........... *G06F 3/0412* (2013.01); *G04G 21/08* (2013.01); *G06F 3/043* (2013.01); *G06F 3/0416* (2013.01);
(Continued)

(58) Field of Classification Search
CPC ...... G06F 3/0412; G06F 3/0416; G06F 3/042; G06F 3/043; G06F 3/0488; G04G 21/08
See application file for complete search history.

(56) References Cited

U.S. PATENT DOCUMENTS 8,624,836 B1 * 1/2014 Miller .................... G06F 1/163
345/157
2012/0249409 A1 * 10/2012 Toney .................... G06F 3/017
345/156
(Continued)

FOREIGN PATENT DOCUMENTS

CN 103995621 A 8/2014
CN 104583921 A 4/2015
(Continued)

OTHER PUBLICATIONS

International Search Report and Written Opinon dated Oct. 28, 2016; PCT/CN2016082219.
(Continued)

*Primary Examiner* — Andrew Sasinowski
(74) *Attorney, Agent, or Firm* — Ladas & Parry LLP

(57) ABSTRACT

A touch control system, a touch control display system and a touch control interaction method are disclosed. The touch control system includes a touch detection device, a touch area positioning device and a processing device connected to both the touch detection device and the touch area positioning device. The touch detection device is configured to detect an occurring position of a touch event in a preset area and to transmit information on the occurring position of the
(Continued)

touch event to the processing device. The touch area positioning device is configured to emit a first light beam and a second light beam to form a first pattern at the first position and a second pattern at the second position. The processing device is configured to process the information to obtain the occurring position of the touch event, and to obtain the first position and the second position.

20 Claims, 5 Drawing Sheets

(51) Int. Cl.
G04G 21/08 (2010.01)
G06F 3/043 (2006.01)
G06F 3/042 (2006.01)

(52) U.S. Cl.
CPC .......... *G06F 3/0421* (2013.01); *G06F 3/0488* (2013.01); *G06F 3/04886* (2013.01)

(56) References Cited

U.S. PATENT DOCUMENTS

| | | | |
|---|---|---|---|
| 2013/0127717 A1* | 5/2013 | Nagashima | G06F 3/0423 345/158 |
| 2015/0177836 A1* | 6/2015 | Ouchi | G06F 3/014 345/156 |
| 2016/0124524 A1 | 5/2016 | Zhao et al. | |
| 2017/0205939 A1 | 7/2017 | Lv | |

FOREIGN PATENT DOCUMENTS

| | | |
|---|---|---|
| CN | 104850275 | 8/2015 |
| CN | 105094675 A | 11/2015 |
| CN | 105159539 A | 12/2015 |
| CN | 205375438 U | 7/2016 |

OTHER PUBLICATIONS

The First Chinese Office Action dated Nov. 28, 2017; Appln. No. 201610084809.6.

\* cited by examiner

TOUCH CONTROL SYSTEM, TOUCH CONTROL DISPLAY SYSTEM AND TOUCH CONTROL INTERACTION METHOD

FIELD OF THE ART

At least one embodiment of the invention relates to a touch control system, a touch control display system and a touch control interaction method.

BACKGROUND

Touch control technologies provide an efficient and convenient man-machine interaction method. Its fundamental principle is to capture a touch position of a touching object (such as a human finger) and movement information first, and then convert the obtained touch position and movement information to electric signals and perform identification and determination, thereby realizing control functions.

On the other hand, with the development of technologies, wearable devices such as smart watches and smart bracelet have become very hot topics in the electronic industry. All these wearable devices normally have touch control functions.

SUMMARY

At least one embodiment of the invention provides a touch control system, a touch control display system and a touch control interaction method, which can avoid touch operations by a user from blocking a display panel.

At least one embodiment of the invention provides a touch control system, comprising a touch detection device, a touch area positioning device, and a processing device which is connected to both the touch detection device and the touch area positioning device by way of a signal connection, wherein the touch detection device is configured to detect occurrence of a touch event in a preset area and to transmit information on an occurring position of the touch event to the processing device; the touch area positioning device is configured to emit a first light beam and a second light beam to the preset area, the first light beam irradiates a first position in the preset area to form a first pattern, the second light beam irradiates a second position in the preset area to form a second pattern; and the processing device is configured to process the information to obtain the occurring position of the touch event, and to obtain the first position and the second position.

At least one embodiment of the invention provides a touch control display system, comprising a display device and the above-mentioned touch control system, wherein the display device comprises a display region, wherein the processing device of the touch control system is further connected to the display device by way of a signal connection and configured to output signals corresponding to the occurring position of the touch event, the first position and the second position obtained by the touch control system.

At least one embodiment of the invention provides a touch control interaction method, comprising: emitting a first light beam and a second light beam to a preset area, wherein the first light beam irradiates a first position in the preset area to form a first pattern, and the second light beam irradiates a second position in the preset area to form a second pattern; determining the first position and the second position; determining a virtual touch area in the preset area by using the first pattern and the second pattern; detecting whether a touch event occurs in the virtual touch area, and determining an occurring position of the touch event if a touch event occurs in the virtual touch area; and transmitting the occurring position of the touch event, the first position and the second position to a preset electronic device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
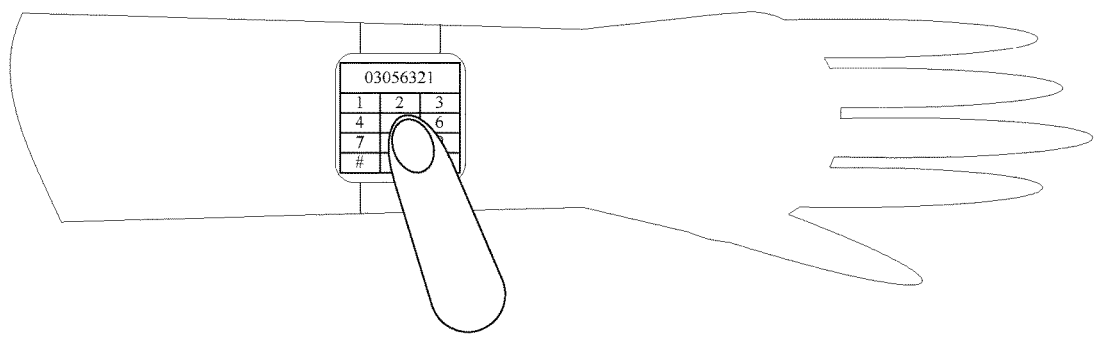
FIG. 1 schematically illustrates a touch control interaction method of a smart watch.

The inventor found during research that display screens of wearable electronic devices such as a smart watch or a smart bracelet are generally of a small area, which may be mostly or completely blocked if a finger operates thereon, thus making it inconvenient for a user to operate and thus harming user experience. As an example, FIG. 1 illustrates a touch control interaction method of a smart watch. As illustrated in FIG. 1, when one arm of a user wears the smart watch and a finger of the other hand touches to operate, as the screen area of the smart watch is limited, the finger will block a part of the screen, thereby influencing the touch by the user and the user experience.

Embodiments of the invention provide a touch control system, a touch control display system, and a touch control interaction method. By transferring an area for touch operation to a preset area outside a display region of a display device to form a virtual touch area, the problem of the display panel being blocked during touch operation is solved.

In the following, the touch control system, the touch control display system and the touch control interaction method provided by the embodiments of the invention will be described with reference to the drawings.

Embodiment 1

Figure 2:
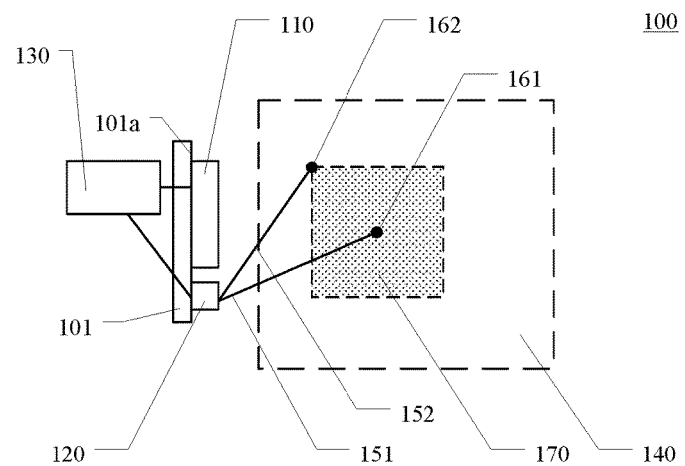
FIG. 2 schematically illustrates a touch control system in accordance with an embodiment of the invention.

The embodiment provides a touch control system. FIG. 2 illustrates a touch control system 100, which comprises a touch detection device 110, a touch area positioning device 120 as well as a processing device 130 connected to the touch detection device 110 and the touch area positioning device 120 by way of a signal connection. The signal connection may be a wired or wireless connection, and the signal may be an electrical signal or an optical signal, which will not be defined here.

As an example, the touch control system 100 further comprises a support device 101 for supporting the touch detection device 110 and the touch area positioning device 120. For example, the touch detection device 110 and the touch area positioning device 120 are arranged on an edge 101a of the support device 101.

The touch detection device 110 is configured to detect occurrence of a touch event in a preset area 140, that is, to detect whether a touch event occurs in the preset area 140. The preset area 140 may be any area within an area range in which the touch detection device 110 may identify a touch event. Moreover, the touch detection device 110 is further configured to transmit information of an occurring position of the touch event to the processing device 130.

The touch area positioning device 120 is configured to emit a first light beam 151 and a second light beam 152 to the preset area 140, the first light beam 151 irradiates a first position in the preset area 140 to form a first pattern 161, the second light beam 151 irradiates a second position in the preset area 140 to form a second pattern 162.

The first pattern 161 and the second pattern 162 may be visible patterns, such that a user may estimate an area for touch operation by observing the positions of the two patterns, so as to perform effective touch operation. Of course, the touch area positioning device 120 may also be configured to emit more than two light beams to the preset area 140 so as to form more than two visible patterns in the preset area 140, which will further facilitate the user to estimate a range of the area for touch operation by way of positions of the patterns.

As an example, the first pattern and the second pattern are light spots formed by the first and second light beams. As an example, the first pattern and the second pattern are of different colors or shapes, such that the user can distinguish between them easily.

The processing device 130 is configured to process the information on the occurring position of the touch event to obtain the occurring position of the touch event, and to obtain the first position and the second position. The first and second positions obtained by the processing device 130 may be information stored in the processing device 130 in advance, or obtained by using the processing device 130 to process the information transmitted from the touch area positioning device 120 thereto.

As an example, the processing device 130 may be implemented as a general calculation device (such as a CPU), a specific calculation device (such as a DSP) and the like.

In the touch control system provided by the embodiment of the invention, the touch area positioning device 120 forms the first pattern 161 and the second pattern 162 in the preset area 140, such that the user may estimate the area for touch operation (i.e., the virtual touch area) according to the first and second patterns. In the virtual touch area, a touch from the user is detected by the touch detection device 110, and the position touched by the user is calculated by the processing device 130. When the touch control system is applied in an electronic device, the position touched by the user in the virtual touch area may correspond to a function for controlling the electronic device, so as to realize man-machine interaction. In this way, by configuring the preset area of the above touch control system outside the display region of the electronic device, the problem of the display panel being blocked during touch operation by the user is solved.

As an example, the touch control system 100 provided by the embodiment is used in wearable electronic devices such as a smart watch, a smart bracelet, a smart ring.

In some examples, the processing device 130 uses the touch area positioning device (for example by using the first and second positions irradiated by the light beams emitted by the touch area positioning device) to establish a coordinate system in the preset area and to calculate coordinates of the occurring position of the touch event in the coordinate system, so as to calculate a relative relationship between the occurring position of the touch event as well as the first and second position. The embodiment of the invention is not limited to the example.

Figure 3A:
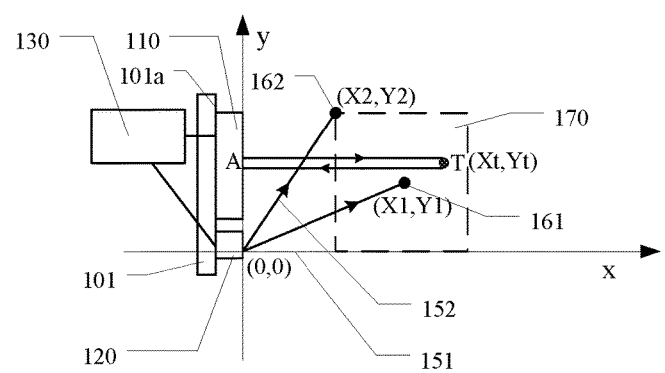
FIGS. 3a and 3b are respectively coordinate systems for calculating a relative relationship between touch positions of a touch event, a first position and a second position in accordance with an embodiment of the invention.

For example, as illustrated in FIG. 3a, an orthogonal projection, on a plane having the preset area MO, of a part of the touch area positioning device 120 emitting the first light beam 151 and the second light beam 152 may be taken as an origin (0,0), an arrangement direction of the touch detection device 110 and the touch area positioning device 120 may be taken as the y-axis, and a direction perpendicular to the y-axis is the x-axis, a coordinate system is established based on the above origin, x-axis, and y-axis. In this case, coordinates of the first position of the first pattern 161, the second position of the second pattern 162, and the occurring position T of the touch event are respectively (X1, Y1), (X2, Y2) and (Xt, Yt).

Figure 3B:
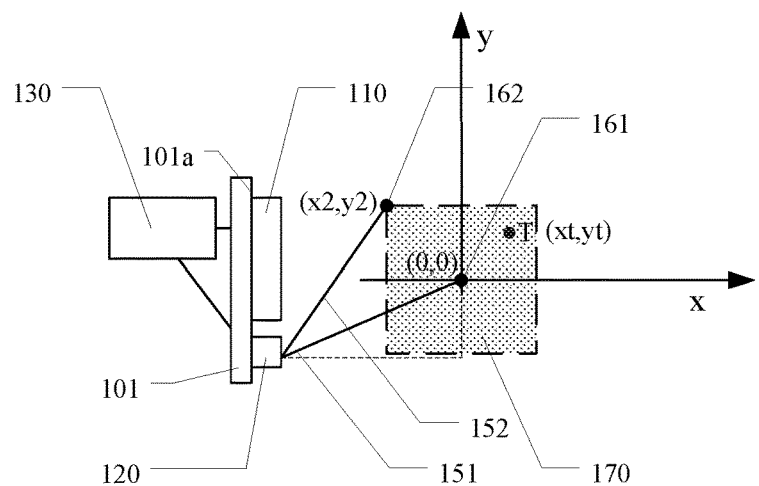

For example, as illustrated in FIG. 3b, a coordinate system is established in a plane having the preset area by taking the first position of the first pattern 161 as an origin (0, 0), a direction parallel to an arrangement direction of the touch detection device 110 and the touch area position device 120 as the y-axis, and a direction perpendicular to the y-axis as the x-axis. In this case, coordinates of the first position of the first pattern 161, the second position of the second pattern 162, and the occurring position T of the touch event are respectively (0, 0), (x2, y2) and (xt, yt).

It can be contemplated that the coordinate system may be established in a way other than those shown in FIGS. 3a and 3b.

In the following; a method for acquiring the coordinates (X1, Y1), (X2, Y2) and (Xt, Yt) of the first position, the second position and the occurring position of the touch event will be described in detail with reference to the coordinate system shown in FIG. 3a.

As illustrated in FIG. 3a, the touch detection device 110 may emit a touch detection signal (as indicated by an arrow from left to right in FIG. 3a) to the preset area 140. When an obstacle such as a finger or a stylus is present in the preset area 104, i.e., when a touch even is happening, the touch detection signal will be reflected back by the obstacle. The touch detection device 110 receives a touch sense signal (as indicated by an arrow from right to left in FIG. 3a) returned from the preset area 140.

As an example, the touch detection device 110 is a ranging sensor, such as a reflective infrared sensor, or an ultrasonic sensor and the like.

For they coordinate Yt of the occurring position of the touch event, as illustrated in FIG. 3a, a distance from a position A of the touch detection signal emitted by the touch detection device 110 and corresponding to the position T to a position of the touch area positioning device 120 which emits the first and second light beams (i.e., the origin of the coordinate system) is used to determine the y coordinate Yt. Note that the distance may be set by the designer when designing the touch control system.

Figure 4:
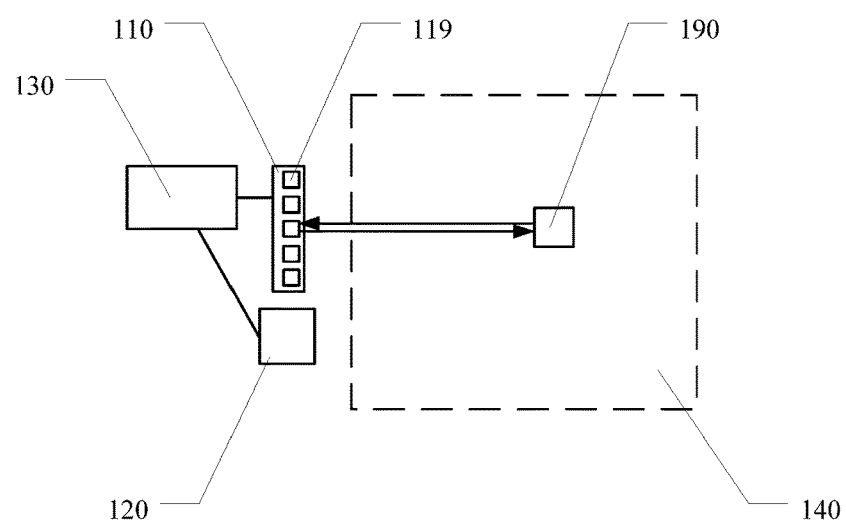
FIG. 4 schematically illustrates a touch detection device, comprising multiple sub-sensors, of a touch control system in accordance with an embodiment of the invention.

In FIG. 3a, the touch detection device 110 may be an array sensor. Alternatively, as illustrated in FIG. 4, the touch detection device 110 may comprise multiple sub-sensors 119. The multiple sub-sensors 119 are sequentially disposed along a direction from the touch detection device 110 to the touch area positioning device 120. Multiple emitting points included in the array sensor or the multiple sub-sensors 119 included in the touch detection device 110 emit touch detection signals respectively to the preset area 140. When a touch sense signal generated from the reflection of one of the touch detection signals by an obstacle 190 (as shown in FIG. 4) is received by the touch detection device 110, the y coordinate Yt of the occurring position of the touch event is determined according to a position of the emitting point or the sub-sensor which emits the touch detection signal.

Figure 5:
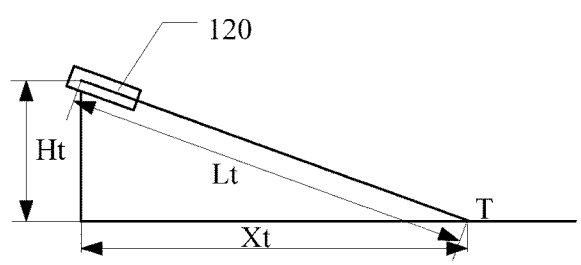
FIG. 5 schematically illustrates a method for calculating an x-coordinate of a touch position of a touch event in accordance with an embodiment of the invention.

For the x coordinate Xt of the occurring position of the touch event, as illustrated in FIG. 5, a distance Lt and a distance Ht are measured and used by the processing device to calculate the x coordinate Xt, wherein the distance Lt is from the touch detection device 110 to the occurring position T of the touch event, and the distance Ht is from the touch detection device 110 to the plane having the preset area. Note that the distance Ht may be determined by the designer when designing the touch control system.

To measure the above distance Lt, for example, the touch detection device 110 employs the principle of time difference ranging. Referring to an example where the touch detection device 110 is an ultrasonic sensor, for example, the ultrasonic sensor emits ultrasonic waves to the preset area and starts timing at the same time. The ultrasonic waves propagate in the air and get reflected when hitting an obstacle. The ultrasonic sensor receives the reflected waves and stops timing at the same time. Then the ultrasonic sensor sends the emitting time T1 of the ultrasonic waves and the receiving time T2 to the processing device of the touch control system 100. The processing device calculates the distance between the ultrasonic sensor and the obstacle according to the time of flight (T2-T1) of the ultrasonic waves and a propagation velocity v of the ultrasonic waves. Therefore, when the principle of time difference ranging is used, the information on the occurring position of the touch event transmitted by the above touch detection device includes the emitting time of the touch detection signal, the receiving time of the touch sense signal, and the propagation velocity of the touch detection signal.

To measure the above distance Lt, for example, the touch detection device 110 employs the principle of strength of a touch sense signal varying along a distance from the obstacle. As an example, the touch detection device 110 is a reflective infrared sensor. The further the reflective infrared sensor is from the obstacle, the smaller the strength of the touch sense signal reflected by the obstacle is. Therefore, the processing device of the touch control system can be used to analyze the strength variation of the infrared light received by the reflective infrared sensor, so as to calculate the distance from the touch detection device 110 to the occurring position of the touch event. In this case, the information on the occurring position of the touch event includes strengths of the touch detection signal and the touch sense signal.

It is noted that the above methods of detecting the touch event by the touch detection device 110 and of calculating the occurring position of the touch event are for exemplary purpose only, embodiments of the invention may include but is not limited to the above methods. Moreover, it may further determine whether a touch operation is a sliding operation by determining continuity of the received touch sense signals in different positions and amount of time difference between the received signals, which will not be elaborated here.

In the following, a method for acquiring the coordinates (X1, Y1) of the first position and the coordinates (X2, Y2) of the second position will be described with further reference to the coordinate system shown in FIG. 3a as well as FIGS. 6a to 7.

Figure 6A:
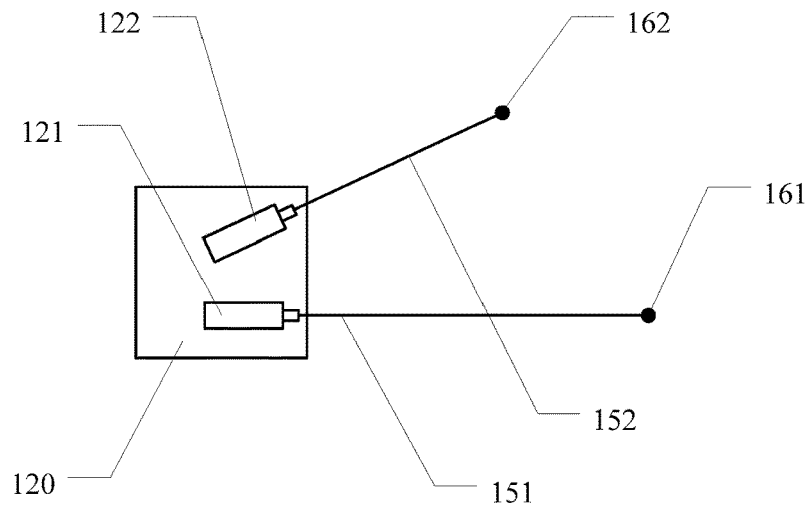
FIG. 6a schematically illustrates a touch area positioning device in accordance with an embodiment of the invention.

For example, as illustrated in FIG. 6a, the touch area positioning device 120 comprises a first emission device 121 and a second emission device 122. The first emission device 121 is configured to emit the first light beam 151, and the second emission device 122 is configured to emit the second light beam 152. FIG. 6a refers to an example where the first emission device 121 emits the first light beam along the horizontal direction and the second emission device 122 emits the second light beam along a tilted direction. It can be contemplated that both emission devices may emit light beams along tilted directions.

As an example, at least one of the first emission device 121 and the second device 122 comprises a laser emitting device. Alternatively, at least one of the first emission device 121 and the second device 122 comprises a visible light emitting device. Of course, the embodiment may also use other emission device to form two visible patterns.

In some examples, positions of the first/second pattern generated by using the first emission device 121/second emission device 122 may be determined in advance by the designer. In this case, for example, the first position of the first pattern 161 and the second position of the second pattern 162 may be obtained according to position parameters of the first emission device 121 and the second emission device 122.

Figure 6B:
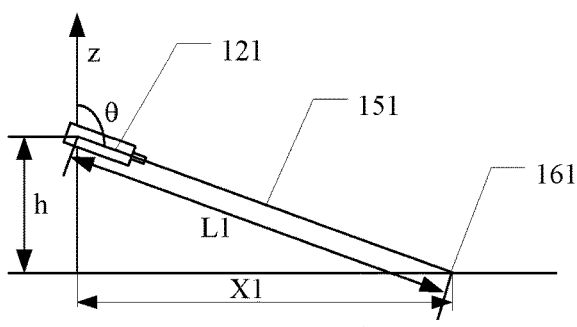
FIG. 6b schematically illustrates a method for obtaining an x-coordinate of a first position in accordance with an embodiment of the invention.

Referring to an example where the first emission device 121 is a laser emitting device shown in FIG. 6a, as illustrated in FIG. 6b, the above position parameters may include a distance h from the laser emitting device to a plane having the preset area (that is, the plane having the first pattern 161, the second pattern 162 and the touch position), and a rotation angle by the laser emitting device relative to the plane having the preset area (180°-θ). The processing device calculates the x coordinate X1 of the first position of the first pattern 161 according to the rotation angle (180°-θ) and the distance h. Alternatively, as illustrated in FIG. 6b, the above position parameters may comprise the distance h from the laser emitting device to the plane having the preset area and a distance L1 between the laser emitting device and the first pattern 161. The processing device calculates the x coordinate X1 of the first position of the first pattern 161 according to h and L1. For example, the principle of time difference ranging is used, the laser emitting device sends the time when the first light beam 151 is emitted, the time when the reflection signal is received and the propagation velocity of the first light beam to the processing device to calculate L1.

Figure 6C:
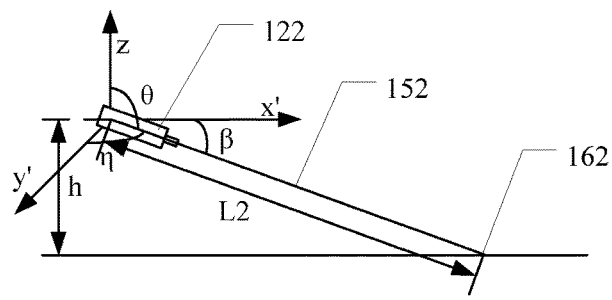
FIG. 6c schematically illustrates a method for obtaining a second position in accordance with an embodiment of the invention.

For example, the above position parameters may include other rotation angles of the laser emitting device. Referring to an example where the second emission device 122 is a laser emitting device shown in FIG. 6a, as illustrated in FIG. 6c, the position parameters of the laser emitting device may include the distance between the laser emitting device and the plane having the preset area, and rotation angles β, η, θ of the laser emitting device. The three rotation angles β, η, θ are respectively inclination angles between the emitted light beam (see the second light beam 152) and an x'-axis (in the same direction as the x-axis in FIG. 3a), between the emitted light beam and a y'-axis (in a direction opposite to the y-axis in FIG. 3a), and between the emitted light beam and a z-axis, when the emission point of the laser emitting device is taken as an origin to form a spatial coordinate system. The processing device calculates the x coordinate X2 of the second position of the second pattern 162 according to the distance h and the rogation angles β, η, θ.

As an example, the respective rotation angles of the laser emitting device may be determined by the designer in advance when designing the touch control system. As an example, the distance between the laser emitting device and the plane having the preset area may be determined in advance. The information determined in advance may be pre-stored into the processing device or a separate storage device.

The above describes the examples of obtaining the x coordinates X1, X2 of the first and second positions. They coordinates of the first and second positions may be determined in a similar way, which will not be elaborated here.

When the coordinate system as shown in FIG. 3b or other coordinate systems are used, after calculating the coordinates of the occurring position T of the touch event as well as the first and second positions, coordinates of the positions in the used coordinate system may be obtained by translating the coordinate system using the processing device.

In some examples, positions of the first/second patterns formed by using the first emission device 121/second emission device 122 are adjustable, such that a user may adjust a size of the touch operation area as needed or based on personal preference. In this case, the above first and second positions may be determined by configuring an image acquisition device in the touch area positioning device.

Figure 7:
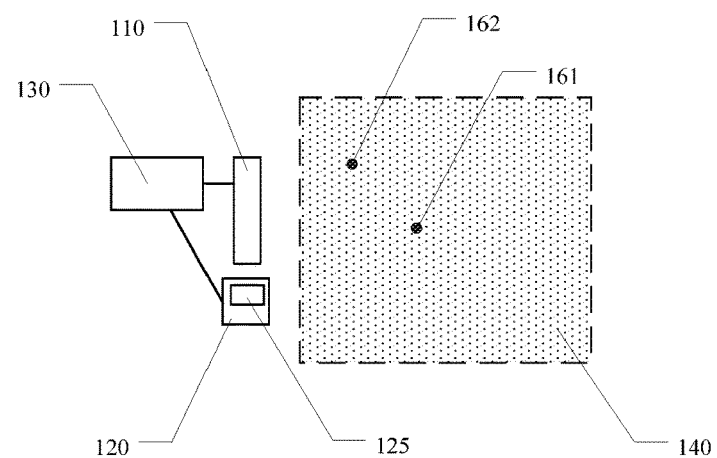
FIG. 7 schematically illustrates a touch control area position device, comprising an image acquisition device, of a touch control system in accordance with an embodiment of the invention.

For example, as illustrated in FIG. 7, in a touch control system provided by at least one example of the embodiment, the touch area positioning device 120 further comprises an image acquisition device 125. The image acquisition device 125 may acquire an image of the preset area 140 including the first pattern 161 and the second patter 162 and transmit the image to the processing device 130, such that the processing device 130 may obtain the first position of the first pattern 161 and the second position of the second pattern 162.

As an example, the image acquisition device 125 is a Charge-coupled device (CCD) image sensor, a CMOS image sensor, an infrared image sensor or similar image capturing devices.

As an example, the processing device processes the obtained image, and calculates the coordinates of the first and second positions according to a distance between the image acquisition device 125 (such as a CCD image sensor) to the plane having the preset area 140) and a rotation angle of the image acquisition device 125. In this case, for example, the touch area positioning device transmits information relative to the first and second positions to the image acquisition device, such as the rotation angle of the image acquisition device and information of the obtained image. Embodiments of the invention include but are not limited to that.

It is noted that the example illustrate in FIG. 7 does not intend to limit the physical position of the image acquisition device 125. For example, when the touch detection device 110 is further provided with an image capturing device such as the above CCD, the image capturing device functions as the above image acquisition device of the touch area positioning device.

In the above example, the touch area positioning device 120 comprises a first emission device and a second emission device. The touch area positioning device may of course include only one emission device. For example, as illustrated in FIG. 8, the touch area positioning device 120 comprises a light emitting device 123 and a light splitting device 124, the light splitting device 124 is configured to split the light beam emitted by the light emitting device 123 into the first light beam 151 and the second light beam 152, so as to form the first pattern 161 and the second pattern 162.

As an example, the light emitting device 123 is a laser emitting device or a visible light emitting device. The embodiment of the invention includes but is not limited to these devices.

Figure 8:
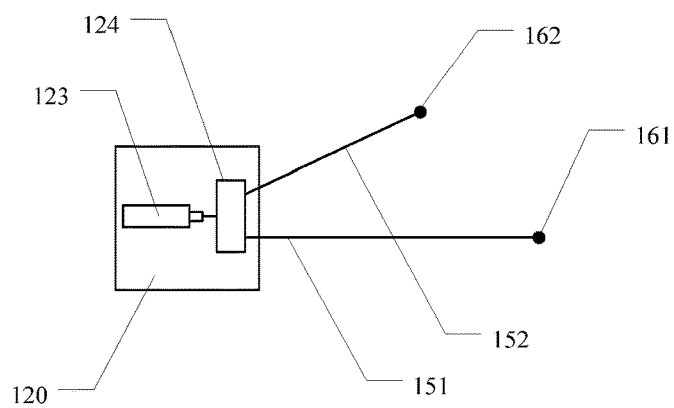
FIG. 8 schematically illustrates a touch area positioning device in accordance with another embodiment of the invention.

For the example shown in FIG. 8, for example, the position parameters of the light emitting device 123 and the light splitting device 124 may be set when designing the touch control system. In this case, the first position and the second position may be calculated according to the position parameters and type of the light splitting device. Alternatively, the positions of the light emitting device 123 and light splitting device 124 are adjustable. In this case, the first position and the second position may be obtained using the above image acquisition device, which will not be elaborated here, for more details please refer to the above description.

As described above, the processing device 130 may obtain the occurring position of the touch event, the first position of the first pattern and the second position of the second pattern, based on the arrangement of the touch detection device and the touch area positioning device. When the touch control system provided by the embodiment is used in an electronic device such as a smart watch, the processing device of the touch control system can transmit these signals about positions to the electronic device, and the electronic device can realize corresponding control functions based on the signals.

Embodiment 2

Figure 9:
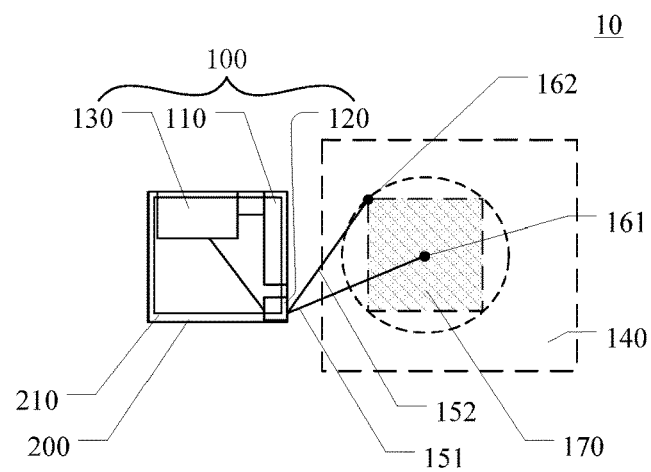
FIG. 9 schematically illustrates a touch control display system in accordance with an embodiment of the invention.

The embodiment provides a touch control display system 10. As illustrated in FIG. 9, the touch control display system 10 comprises a display device 200 having a display region 210 and the touch control system 100 described in the embodiments of the invention (for example, all or part of implementations of Embodiment 1). The touch control system 100 comprises the touch detection device 110, the touch area positioning device 120 as well as the processing device 130 connected to both the touch detection device 110 and the touch area positioning device 120 by way of a signal connection. The processing device 130 of the touch control system 100 is further connected to the display device 200 by way of a signal connection and configured to output signals corresponding to the occurring position of the touch event, the first position and the second position obtained by the touch control system 100 to the display device 200.

The above signal connection may be a wired or wireless connection using an electrical signal or an optical signal, which will not be defined here.

As an example, the display region is used to display a user interface (UI), which includes for example pictures, texts or signs. It may display other application interfaces, such as a video interface.

For position relationships, cooperation relationships and functions of the respective components of the touch control system 100 please refer to the description in Embodiment 1, which will not be elaborated here.

The touch control display system 10 provided by the embodiment can transfer the area for touch operation to a preset area 140 outside the display region 210, thereby solving the problem of the display panel being blocked during touch operation.

As an example, the processing device 130 or the display device 200 is further configured to form a virtual touch area 170 (i.e., the touch operation area of Embodiment 1) in the preset area 140 according to the first pattern 161 and the second pattern 162 generated by the touch area positioning device 120 of the touch control system 100, and to establish a correspondence relationship between the virtual touch area 170 and the display region 210 of the display device 200 according to information of the first position and the second position as well as information of the display region. That is, each position in the display region 210 has a corresponding position in the virtual touch area 170, which means the display region 210 and the virtual touch area 170 have a mapping relationship.

It is noted that the processing device 130 of the touch control system 100 may be disposed inside the display device 200 (as illustrated in FIG. 9) or outside the display device 200. Moreover, the touch control system 100 and the display device 200 may share a processing device, or both the touch control system 100 and the display device 200 may be provided with their own processing devices and the two processing devices are connected by way of a signal connection.

In the following, the corresponding relationship between the virtual touch area 170 and the display region 210 will be described with reference to examples.

As an example, when the display device 200 has a square display region 210 shown in FIG. 9, a circle is defined by taking the first position of the first pattern 161 as the center of the circle and a segment from the first pattern 161 to the second pattern 162 as a radius. An area covered by an inscribed square of the circle is considered as the virtual touch area 170.

As another example, when the display device has a circular display region, a circular region may also be defined, by taking the first pattern 161 of FIG. 9 as the center of the circle and the a segment from the first pattern 161 to the second pattern 162 as a radius. The circular region is considered as the virtual touch area 170.

When the display region 210 of the display device 200 and the virtual touch area 170 have a same outline (e.g., the above square or circle), a size of the formed virtual touch area 170 may be the same as that of the display region 210 of the display device 200. The size of the virtual touch area 170 may be of course scaled as needed, such that it is different from the size of the display region 210 of the display device 200.

Moreover, the display region 210 of the display device 200 and the virtual touch area 170 may have different outlines. For example, when the display device 200 has a rectangular display region, a circle may be defined by taking the first pattern 161 as the center of the circle and a segment from the first pattern 161 to the second pattern 162 as a radius to form the circle. An area covered by an inscribed square of the circle is considered as the virtual touch region 170. In this case, for example, the long and the short sides of the rectangular display region corresponding to the square virtual touch region 170 may be scaled in a certain way to establish a correspondence relationship between the virtual touch region and the display region.

It is noted that the above method of defining the virtual touch region by using the first position of the first pattern 161 and the second position of the second pattern 162 are for exemplary purpose only. The embodiment does not intend to limit the relationship between the outlines or sizes of the virtual touch area and the display region, as long as individual positions in the display region 210 of the display device 200 have corresponding positions in the virtual touch area 170 (that is, the display region and the virtual touch area have a mapping relationship).

Figure 10:
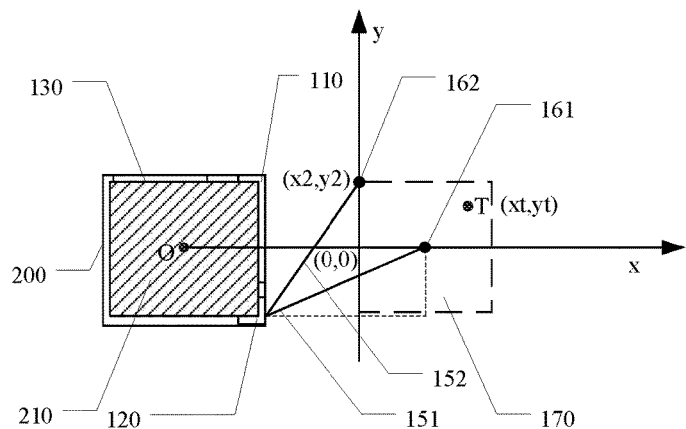
FIG. 10 schematically illustrates a coordinate system of a virtual touch control area in a touch control display system in accordance with an embodiment of the invention.

As an example, when the mapping relationship between the virtual touch area 170 and the display region 210 is established, a line from the center point O of the display region 210 to the first position of the first pattern 161 may be taken as the x-axis, and a line perpendicular to the above line and passing the second position of the second pattern 162 may be taken as the y-axis, as illustrated in FIG. 10.

After establishing the mapping relationship between the virtual touch area 170 and the display region 210, when the user performs a touch operation in the virtual touch region 170, it is equivalent to touching a corresponding position in the display region of the display device of FIG. 1 for touch interaction purpose.

As an example, during the operation of the touch control system, the display region 210 of the display device 200 display a sign corresponding to the touch position. For example, the sign is a mouse or a cursor. By this means, information generated by the touch operation can be fed back to the user, which will facilitate further operation from the user. The embodiment of the invention includes but is not limited to the above example.

Figure 11:
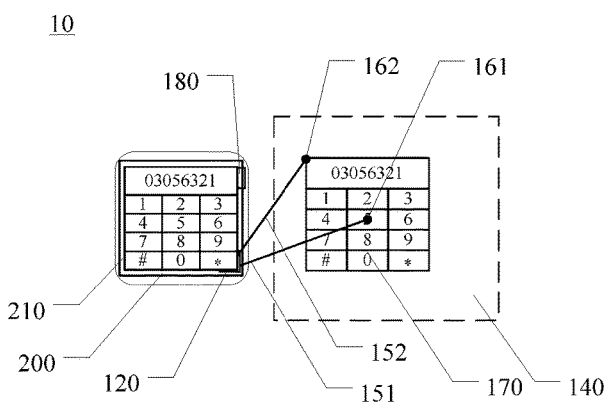
FIG. 11 schematically illustrates a touch control display system comprising a projector in accordance with an embodiment of the invention.

For example, as illustrated in FIG. 11, at least one example of the embodiment provides a touch control system 10 which further comprises a projector 180. The projector 180 is configured to project contents displayed in the display region 210 of the display device 200 to the preset area 140 of the touch control system. By projecting the content displayed in the display region 210, the user can more accurately perform the touch operation. In some examples, when the virtual touch area formed in the preset area of the touch control system is adjustable, for example, a projection direction of the projector is adjusted accordingly, such that it can match the position and the size of the virtual touch area.

Figure 12:
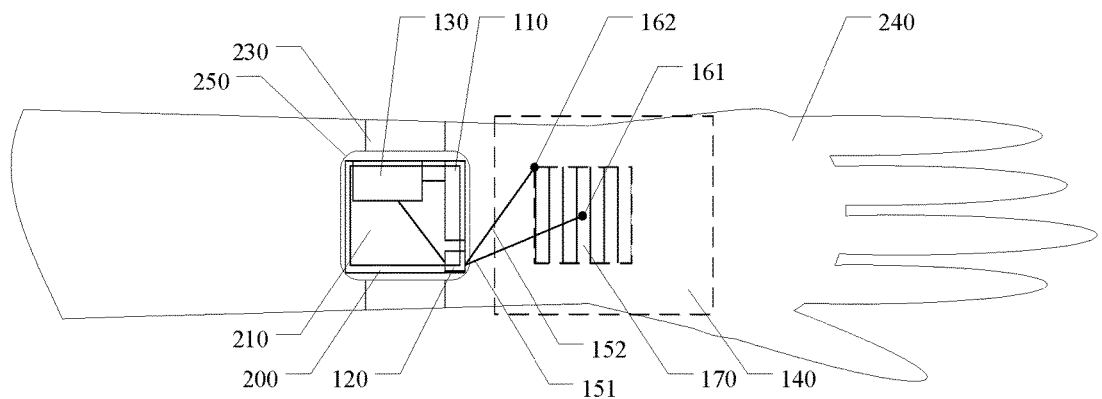
FIG. 12 schematically illustrates a position relationship between a smart watch and an arm of a user, in accordance with an embodiment of the invention.

For example, as illustrated in FIG. 12, the touch control display system provided by the embodiment of the invention is used in a smart watch. The smart watch comprises a smart watch body 250 and a wristband 230 for securing the smart watch body 250 on the arm 240. The embodiment of the invention includes but is not limited to the example. The touch control display system may be also used in other electronic devices, such as a smart bracelet, a smart finger ring, smart glasses and other wearable electronic devices.

For example, as illustrated in FIG. 12, the display device 200 and the preset area 140 of the touch control system are sequentially disposed along a direction parallel to the display region 210. Such a configuration makes it easier for the user to perform touch operation on the touch control display system, and to a certain extent simplifies the structure of the touch control system. Referring to an example of using the touch control display system in the smart watch shown in FIG. 12, a plane having the preset area 140 of the touch control system may be essentially in the same plane as a bottom surface of the electronic device (such as the bottom surface of the smart watch close to the user arm 240 of FIG. 12). Therefore, a distance between the touch control positioning device 120 and the bottom surface of electronic device may be taken as the distance between the touch control positioning device (e.g., a laser emitting device, an image acquisition device and the like) and the plane having the preset area 140, of Embodiment 1, such that a separate ranging device may be omitted.

For example, as illustrated in FIG. 12, in the direction parallel to the display region 210, the touch detection device 110 and the touch area positioning device 120 are disposed between the display region 210 of the display device 200 and the preset area 140 of the display region 210. For example, it is disposed on a part of the frame of the display device 200 which is close to the preset area 140 (e.g., the support device 101 of Embodiment 1 may function as the frame). In this way, the y coordinate of the occurring position of the touch event may be obtained according to physical positions of touch detection device 110 and the touch area positioning device 120 disposed on the frame, thereby simplifying the structure of the touch control display system.

Embodiment 3

The embodiment provides a touch control interaction method applicable to various touch control devices. As illustrated in FIG. 2, the method comprises the following steps S301 to S305.

Step 301: emitting a first light beam 151 and a second light beam 152 to a preset area 140, allowing the first light beam 151 to irradiate a first position in the preset area 140 to form a first pattern 161, the second light beam 152 to irradiate a second position in the preset area 140 to form a second pattern 162.

As an example, a laser emitting device or a visible light emitting device is used to emit the first light beam 151 and the second light beam 152 to the preset area 140. For example, when the laser emitting device is used, a lower power laser emitting device may be used, so as to avoid burning an irradiated surface (such as skin of a user).

In some examples, emission directions and angles of the first light beam 151 and the second light beam 152 are adjustable. In some other examples, the first pattern 161 and the second pattern 162 are distinguished by using different colors or patterns, making it easier for the user's identification. Of course, more than two light beams may be emitted to the preset area 140 to form more than two patterns in the preset area 140.

Step 302: determining the first position and the second position.

As an example, the first position and the second position are obtained by acquiring and processing an image, the image comprises the preset area 140 including the first pattern 161 and the second pattern 162. For detailed methods please refer to FIG. 7 and the description thereof in Embodiment 1.

As an example, when the laser emitting device is used to emit the first light beam 151 and the second light beam 152, position parameters of the laser emitting device are used to obtain the first position and the second position. For detailed methods please refer to FIGS. 6a to 6c and the description thereof in Embodiment 1.

As an example, the above position parameters includes a distance from the laser emitting device to a plane having the preset area 140 and a rotation angle by the laser emitting device relative to the plane having the preset area. Alternatively, the above position parameters includes a distance from the laser emitting device to a plane having the preset area and a distance from the laser emitting device to the first pattern 161 or the second pattern 162.

Step 303: determining a virtual area 170 in the preset area 140 by using the first pattern 161 and the second pattern 162.

As an example, the virtual touch area 170 is a square region defined by taking the first pattern 161 as the center of the virtual touch area 170 and the second pattern 162 as one corner of the virtual touch area 170. As another example, the virtual touch area 170 is a circle defined by taking the first pattern 161 as the center of the circle and a distance between the first pattern 161 and the second pattern 162 as a radius. These examples are not limitative to the embodiment.

Step 304: detecting whether a touch event occurs in the virtual touch area 170, and determining an occurring position of the touch event if a touch event occurs in the virtual touch area 170.

As an example, a touch detection signal is transmitted to the virtual touch area 170 and a touch sense signal fed back from the virtual touch area 170 is received therefrom, thereby determining whether the touch event occurs in the virtual touch area 170 or not.

As an example, a touch detection device such as a reflective infrared sensor or an ultrasonic sensor is used to detect the presence of touch event. If a touch event happens, the touch detection signal emitted by the touch detection device and transmitted to the virtual touch area 170 will be reflected by an obstacle such as a finger or a stylus, thereby determining whether a touch event occurs. For example, the occurring position of the touch event is calculated by using a time difference ranging method, a relationship between strength of the touch sense signal and the distance between the emission position of the touch detection signal and the obstacle, or other methods. For more detail please refer to the description in Embodiment 1, which will not be elaborated here.

S305: transmitting the occurring position of the touch event, the first position and the second position to a preset electronic device.

For example, the preset electronic device can determine an instruction corresponding to a signal about the occurring position of the touch event, the first position and the second position, so as to realize a control function corresponding to the touch operation. The preset electronic device may be any electronic device capable of realizing necessary control functions.

The touch control interaction method provided by the embodiment of the invention can be applied on a wearable electronic device such as a smart watch, a smart bracelet and so on. By configuring the virtual touch area in the preset area, which is for example outside the display region, the problem of the display panel being blocked during touch operation is solved.

For example, as illustrated in FIG. 9, the preset electronic device comprises a display device 200, and the method further comprises: determining a correspondence relationship between the virtual touch area 170 and the display region 210 of the display device 200 according to the first position and the second position. That is, the mapping relationship between the virtual touch area 170 and the display region 210 is determined, such that a touch operation at a position in the virtual touch area 170 is converted to a touch to a corresponding position in the display region 210.

As an example, the display device 200 and the preset area 140 are arranged sequentially along a direction parallel to the display region 210. For more detail please refer to the description of Embodiment 2, which will not be elaborated here.

As an example, the touch control interaction method provided by at least one example of the embodiment further comprises: displaying a sign corresponding to the touch position by the display region 210 of the display device 200. Thus, information about the touch operation can be fed back to the user, so as to facilitate further operation by the user.

As an example, the touch control interaction method provided by at least one example of the embodiment further comprises: projecting contents displayed in the display region 210 of the display device 200 to the virtual touch area 170, which will facilitate touch operation by the user in the virtual touch area 170.

For details of the method provided by the embodiment, please refer to relevant description of Embodiments 1 and 2, which will not be elaborated here.

In summary, the touch control system, the touch control display system and the touch control interaction method provided by the embodiment of the invention provides a new virtual touch control interaction method, which can avoid touch operations from blocking a screen by making the touch control interaction to happen outside the screen of the electronic device.

Please note the following:
1) in the drawings only structures relevant to the embodiments of the invention are illustrated, other structures may use a conventional design.
2) irrelevant parts are omitted to avoid obscuring embodiments of the invention;
3) features of different embodiments may be combined when not contradicting each other.

What is described above is related to the illustrative embodiments of the disclosure only and not limitative to the scope of the disclosure; the scopes of the disclosure are defined by the accompanying claims.

The present application claims priority from Chinese Application No. 201610084809.6, filed on Feb. 14, 2016, the disclosure of which is incorporated herein by reference in its entirety.

What is claimed is:

1. A touch control display system, comprising a touch detection device, a touch area positioning device, and a processing device which is connected to both the touch detection device and the touch area positioning device by way of a signal connection, wherein,
   the touch detection device is configured to detect occurrence of a touch event in a preset area and to transmit information on an occurring position of the touch event to the processing device;
   the touch area positioning device is configured to emit a first light beam and a second light beam to the preset area, the first light beam irradiates a first position in the preset area to form a first pattern, the second light beam irradiates a second position in the preset area to form a second pattern;
   the processing device is configured to process the information to obtain the occurring position of the touch event, and to obtain the first position and the second position;
   the touch control display system further comprises a display device, and the preset area that is irradiated by the first light beam and the second light beam is outside a display region of the display device;
   the processing device is configured to establish a coordinate system in the preset area by using the first position irradiated by the first light beam and the second position irradiated by the second light beam and to calculate coordinates of the occurring position of the touch event in the coordinate system, so as to calculate a relative relationship between the occurring position of the touch event, the first position and the second position.

2. The touch control display system of claim 1, wherein the touch area positioning device comprises a first emission device and a second emission device, the first emission device is configured to emit the first light beam, and the second emission device is configured to emit the second light beam; or
   the touch area positioning device comprises a light emitting device and a light spotting device, the light splitting device is configured to split a light beam emitted by the light emitting device into the first light beam and the second light beam.

3. The touch control display system of claim 2, wherein at least one of the first emission device, the second emission device and the light emitting device comprises a laser emitting device; or
   at least one of the first emission device, the second emission device and the light emitting device comprises a visible light emitting device.

4. The touch control display system of claim 1, wherein the touch area position device further comprises an image acquisition device;
   the image acquisition device is configured to acquire an image of the preset area comprising the first pattern and the second patter and transmitting the image to the processing module.

5. The touch control display system of claim 1, wherein the touch detection device is configured to transmit a touch detection signal to the preset area and to receive a touch sense signal returned from the preset area.

6. The touch control display system of claim 1, wherein the touch detection device is a reflective infrared sensor or an ultrasonic sensor.

7. The touch control display system of claim 1, wherein the touch detection device comprises a plurality of sub-sensors, the plurality of sub-sensors are sequentially disposed along a direction from the touch detection device to the touch area positioning device.

8. The touch control display system, of claim 1, wherein the processing device of the touch control system is further connected to the display device by way of a signal connection and configured to output signals corresponding to the occurring position of the touch event, the first position and the second position obtained by the touch control system.

9. The touch control display system of claim 8, wherein the display device and the preset area of the touch control system are sequentially disposed along a direction parallel to the display region.

10. The touch control display system of claim 9, wherein along the direction parallel to the display region, the touch detection device and the touch area positioning device are disposed between the display region of the display device and the preset area of the touch control system.

11. The touch control display system of claim 8, wherein the processing device or the display device is further configured to form a virtual touch area in the preset area according to the first pattern and the second pattern, and to establish a correspondence relationship between the virtual touch area and the display region of the display device according to information of the first position and the second position as well as information of the display region.

12. The touch control display system of claim 8, wherein during operation of the touch control display system, the display region of the display device displays a sign corresponding to the occurring position.

13. The touch control display system of claim 8, further comprising:
a projector configured to project contents displayed in the display region of the display device to the preset area of the touch control system.

14. A touch control interaction method, comprising:
emitting a first light beam and a second light beam to a preset area, wherein the first light beam irradiates a first position in the preset area to form a first pattern, and the second light beam irradiates a second position in the preset area to form a second pattern;
determining the first position and the second position;
determining a virtual touch area in the preset area by using the first pattern and the second pattern;
detecting whether a touch event occurs in the virtual touch area, and determining an occurring position of the touch event if a touch event occurs in the virtual touch area; and
transmitting the occurring position of the touch event, the first position and the second position to a preset electronic device,
wherein
the preset area that is irradiated by the first light beam and the second light beam outside a display region of the display device;
the method further comprises: establishing a coordinate system in the preset area by using the first position irradiated by the first light beam and the second position irradiated by the second light beam and calculating coordinates of the occurring position of the touch event in the coordinate system, so as to calculate a relative relationship between the occurring position of the touch event, the first position and the second position.

15. The method of claim 14, wherein the preset electronic device comprises a display device, the method further comprises:
determining a correspondence relationship between the virtual touch area and the display region of the display device according to the first position and the second position.

16. The method of claim 15, wherein the display region of the display device is configured to display a sign corresponding to the occurring position.

17. The method of claim 15, further comprising: projecting contents displayed in the display region of the display device to the virtual touch area.

18. The method of claim 14, wherein,
obtaining an image of the preset area including the first pattern and the second pattern, processing the image to obtain the first position and the second position; or
emitting, by a laser emitting device, the first light beam and the second light beam, and obtaining the first position and the second position by using position parameters of the laser emitting device.

19. The method of claim 18, wherein
the position parameters comprise a distance between the laser emitting device and a plane having the preset area and a rotating angle from the laser emitting device relative to the preset area, or
the position parameters comprise a distance between the laser emitting device and a plane having the preset area and a distance between the laser emitting device and the first or second pattern.

20. The method of claim 14, wherein,
transmitting a touch detection signal to the virtual touch area, receiving a touch sense signal returned from the virtual touch area, and determining the touch event occurring in the virtual touch region.

* * * * *